(12) United States Patent
Mendez

(10) Patent No.: US 11,485,443 B2
(45) Date of Patent: Nov. 1, 2022

(54) FRICTION MOTOR POWERED SCOOTER

(71) Applicant: George J. Mendez, Las Vegas, NV (US)

(72) Inventor: George J. Mendez, Las Vegas, NV (US)

( * ) Notice: Subject to any disclaimer, the term of this patent is extended or adjusted under 35 U.S.C. 154(b) by 264 days.

(21) Appl. No.: 17/011,342

(22) Filed: Sep. 3, 2020

(65) Prior Publication Data

US 2021/0078664 A1  Mar. 18, 2021

Related U.S. Application Data

(60) Provisional application No. 62/900,843, filed on Sep. 16, 2019.

(51) Int. Cl.

| | | |
|---|---|---|
| *B62K 11/10* | (2006.01) | |
| *B62K 11/14* | (2006.01) | |
| *B62K 21/16* | (2006.01) | |
| *B62L 1/00* | (2006.01) | |
| *B62M 3/08* | (2006.01) | |
| *B62J 6/022* | (2020.01) | |
| *B62J 6/04* | (2020.01) | |
| *B62J 9/21* | (2020.01) | |
| *B62L 3/02* | (2006.01) | |

(52) U.S. Cl.
CPC ............ *B62K 11/10* (2013.01); *B62J 6/022* (2020.02); *B62J 6/04* (2013.01); *B62J 9/21* (2020.02); *B62K 11/14* (2013.01); *B62K 21/16* (2013.01); *B62L 1/00* (2013.01); *B62L 3/026* (2013.01); *B62M 3/08* (2013.01); *B62K 2202/00* (2013.01)

(58) Field of Classification Search
CPC ........ B62K 11/10; B62K 11/14; B62K 21/16; B62K 2202/00; B62K 3/002; B62J 6/022; B62J 6/04; B62J 9/21; B62L 1/00; B62L 3/026; B62M 3/08; B62M 1/24
See application file for complete search history.

(56) References Cited

U.S. PATENT DOCUMENTS

| | | | | |
|---|---|---|---|---|
| 5,916,007 | A * | 6/1999 | Maxim ................. | A63H 29/04 446/130 |
| 9,669,960 | B1 * | 6/2017 | Reznikov ............... | A61G 5/10 |
| 2003/0082992 | A1 * | 5/2003 | Spalinski .............. | A63H 17/36 446/465 |
| 2007/0270076 | A1 * | 11/2007 | Gutierrez .............. | A63H 17/26 446/470 |
| 2008/0174210 | A1 * | 7/2008 | Kitamura .............. | H05B 45/37 310/67 A |
| 2010/0007111 | A1 * | 1/2010 | Adams ................... | B62M 1/30 280/267 |
| 2014/0365058 | A1 * | 12/2014 | Senoo .................... | B60L 3/102 701/22 |

* cited by examiner

*Primary Examiner* — Kevin Hurley
*Assistant Examiner* — Marlon A Arce
(74) *Attorney, Agent, or Firm* — Weiss & Moy, P.C.; Jeffrey D. Moy

(57) ABSTRACT

A scooter has a front wheel at a proximal end of a platform and a rear wheel at opposing distal end of the platform. A shaft extends upward from the proximal end of the platform. The shaft terminating in a handle bar. A friction motor propels one of the front wheel or the rear wheel of the scooter the scooter.

18 Claims, 4 Drawing Sheets

FRICTION MOTOR POWERED SCOOTER

RELATED APPLICATIONS

This patent application is related to U.S. Provisional Application No. 62/900,843 filed Sep. 16, 2019, entitled "FRICTION MOTOR POWER SCOOTER" in the name of George J. Mendez, and which is incorporated herein by reference in its entirety. The present patent application claims the benefit under 35 U.S.C. § 119(e).

TECHNICAL FIELD

This invention relates to personal transportation devices, and more particularly to a scooter with uses a selectively engaged friction motor to propel the scooter in a forward motion.

BACKGROUND

Scooters have become increasingly popular mode of transportation. Scooters may be compact in size and may be environmentally friendly making them a convenient and eco-friendly mode of transportation. Scooters may be characterized as having a front wheel and a rare wheel. A platform upon which a rider may stand may be attached to the front wheel and a rare wheel. A handle bar may extend upward from the platform. The user, while standing on the platform may hold the handle bar. The handle bar may be used to support the rider and to control turn a turning direction of the front wheel.

Scooters may be propelled in different manners. Kick scooters may be propelled forward by a user pushing off the ground with their foot to gain speed. Once the user has gained sufficient momentum or speed, the user may rest both feet on the platform and may glide along the ground until the user either comes to a stop, or the user again pushes off the ground to increase their speed and continue their forward travel. Alternatively, some scooters may come equipped with a gas or electric motors that propel the scooter without the user having to push off the ground to maintain movement. However, gas motors may require refueling and may produce greenhouse gases and other pollutants. Electric motors utilize rechargeable batteries that may need to plugged into the electrical grid for recharging. Overtime the charge capacity of rechargeable batteries may decline which may lead to decreases in the operating range of the scooter.

A friction motor is a mechanism that has typically been used to propel toy cars, trucks, trains, action figures and similar toys. A friction motor may have a large flywheel which may be connected to the drive wheels of the toy via a low gear ratio, so that the flywheel revolves faster. The flywheel's axis may be perpendicular to the direction in which the toy faces and moves. When the toy is pushed forward, the drive wheels may engage the flywheel. Pushing the vehicle forward repeatedly may spin this flywheel up to speed. When let go, the flywheel may drive the vehicle forward. The flywheel may store the kinetic energy of the initial acceleration and may propel the toy forward after it is released.

Therefore, it would be desirable to provide a scooter that overcome the above problems. The scooter may be an environmentally friendly scooter that provides a motorized assist to a riding user.

SUMMARY

In accordance with one embodiment, a scooter is disclosed. The scooter has a front wheel at a proximal end of a platform and a rear wheel at an opposing distal end of the platform. A shaft extends upward from the proximal end of the platform. The shaft terminates in a handle bar. A friction motor propels one of the front wheel or the real wheel of the scooter.

In accordance with one embodiment, a scooter is disclosed. The scooter has a platform. A front wheel is rotateably coupled to a proximal end of the platform. A rear wheel is rotateably coupled at an opposing distal end of the platform. A shaft extends upward from the proximal end of the platform, the shaft terminating in a handle bar. A friction motor engages and propels the rear wheel of the scooter. A foot pedal is coupled to the friction motor to wind the friction motor.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The invention has utility as a scooter which may have a selectively engaged friction motor. Embodiments of the inventive motorized scooter may be easy to ride and operate without the need for gasoline or electric charge. Embodiments of the kick scooter may be powered by a lightweight yet durable friction motor, which may allow a rider to easily gain momentum with each push. In one embodiment of the scooter, the friction motor may be replaceable. In accordance with one embodiment of the scooter, the friction motor may be mounted within an accessible housing secured to an underside of the scooter platform. It is appreciated that the friction motor may be mounted above the rear wheel in specific inventive embodiments. Embodiments of the inventive scooter may be equipped with a lever operated brake and a lever-operated clutch, where the clutch may be used to selectively engage the friction motor with either the front or rear wheel of the scooter.

In accordance with one inventive embodiment, a foot pedal may be used to wind-up a friction motor with the rider stepping on the foot pedal multiple times to perform the winding action, where the pedal is then released to propel the scooter movement. In accordance with one inventive embodiment, a clutch may be used to disengage the friction motor from a drive wheel during winding, and re-engage the friction motor to the drive wheel so that once the friction motor is wound (revved up), the motor may be allowed to unwind and provide power to the drive wheel. Subsequently, the friction motor may be disengaged to allow the motor to be revved up again for another cycle where the clutch re-engages the motor to the scooter drive wheel.

Embodiments of the inventive scooter with a selectively engaged friction motor may be a foldable, lightweight scooter with a telescoping handle bar, and may be further equipped with a collapsible basket for the convenient transport of goods and items, as well as a front facing light and rear facing light.

Figure 1:
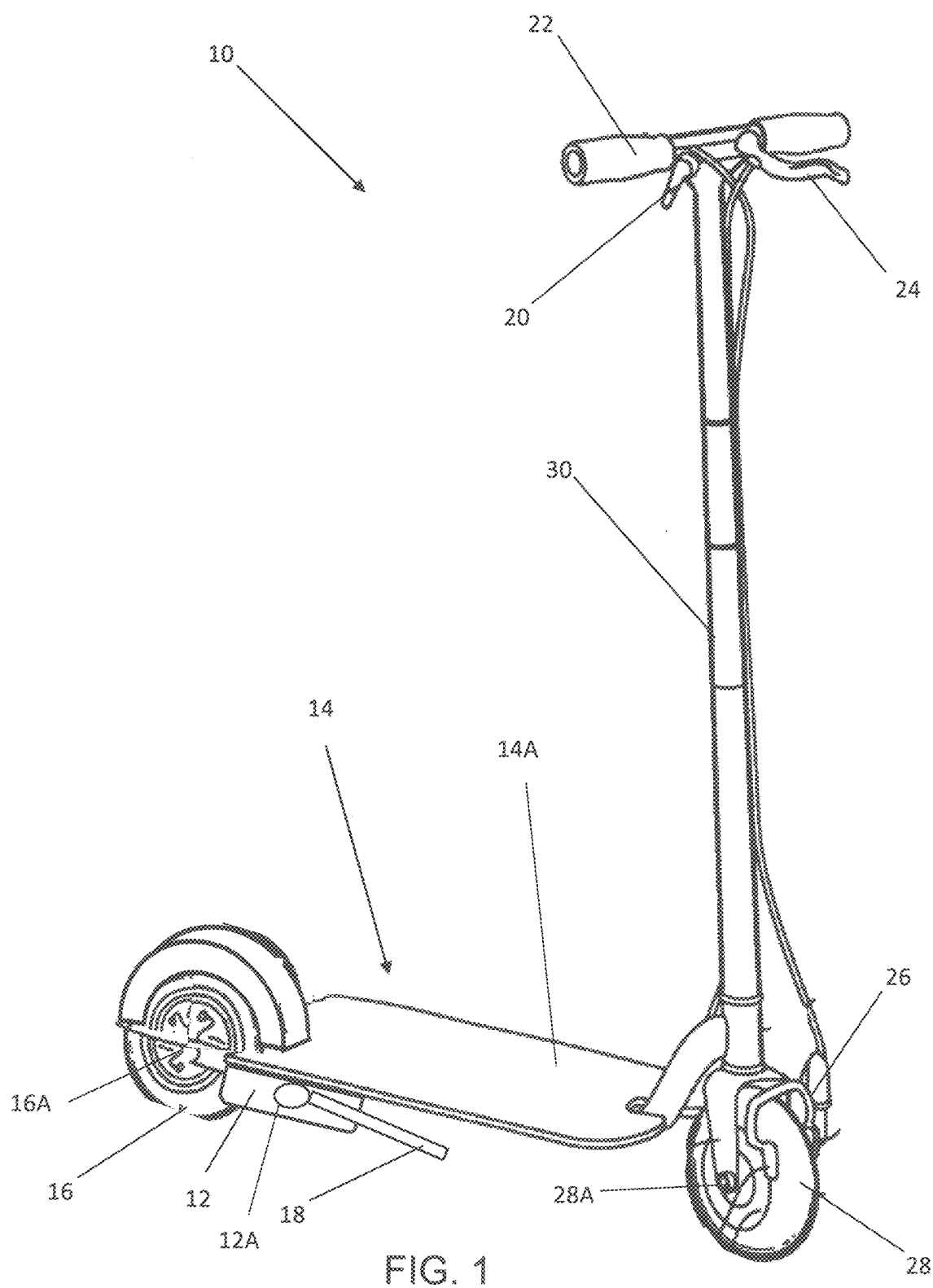
FIG. 1 is a perspective view of an exemplary embodiment of a scooter with a rear wheel friction drive motor mounted underneath the platform of the scooter in accordance with one embodiment of the invention.

Referring now to the figures, FIG. 1 is a perspective view of an embodiment of the inventive scooter 10. The scooter 10 may have a platform 14. A rear wheel 16 may be rotateably coupled to the platform 14. An axle assembly 16A may be coupled to the platform 14 wherein the rear wheel 16 may rotate about the axle assembly 16A A rear wheel friction drive motor 12 may be mounted underneath the platform 14 and adjacent to the rear wheel 16 of the scooter 10. The friction drive motor 12 may have a foot pedal 18 for winding the friction drive motor 12. A spring loaded ratchet mechanism 12A may be used to allow the foot pedal 18 to wind up the friction drive motor 12. The spring loaded ratchet mechanism 12A may work such that rotating the foot pedal 18 in a first direction (i.e., clockwise) may cause the flywheel of the friction drive motor 12 to rotate and store kinetic energy. Releasing the foot pedal 18, i.e., removing pressure from the foot pedal 18, may allow the foot pedal 18 to return to an original start position (i.e., rotate in a counter-clockwise direction) where the user may again apply pressure to rotate the foot pedal 18 in the first direction (i.e., clockwise) to again rotate the flywheel of the friction drive motor 12.

A handle bar 22 may extend up from a front area of the platform 14. The handle bar 22 may be rotateably coupled to the platform 14 allowing the handle bar 22 to rotate in a clockwise or counter-clockwise direction in relation to the top surface 14A of the platform 14. In accordance with one embodiment, the handle bar 22 may be mounted on a proximal end of a telescoping shaft 30, where the distal end of the telescoping shaft 30 terminates at the front wheel 28. The front wheel 28 may be rotateably coupled to the telescoping shaft 30 via an axle assembly 28A. The telescoping shaft 30 may be adjusted to accommodate the height of the handle bar 22 with respect to requirements of a rider.

In specific inventive embodiments, the front wheel 28 may be steerable in conjunction with the turning of the handle bar 22. As stated above, the handle bar 22 may be rotateably coupled to the platform 14 allowing the handle bar 22 to rotate in a clockwise or counter-clockwise direction in relation to the top surface 14A of the platform 14. Rotation of the handle bar 22 may allow one to steer the front wheel 28 in a desired direction.

A lever-operated clutch 20 may be mounted on the handle bar 22. The lever-operated clutch 20 may be used to control the friction drive motor 12. The lever-operated clutch 20 may allow a user to engage and disengage the friction drive motor 12 to the rear wheel 16. The user may engage the friction drive motor 12 to the rear wheel 16 once the user has would up the flywheel using the foot pedal 18. A brake lever 24 may be mounted on the handle bar 22. The brake lever 24 may be used to control a brake mechanism 26 mounted at the front wheel 28.

Figure 2A:
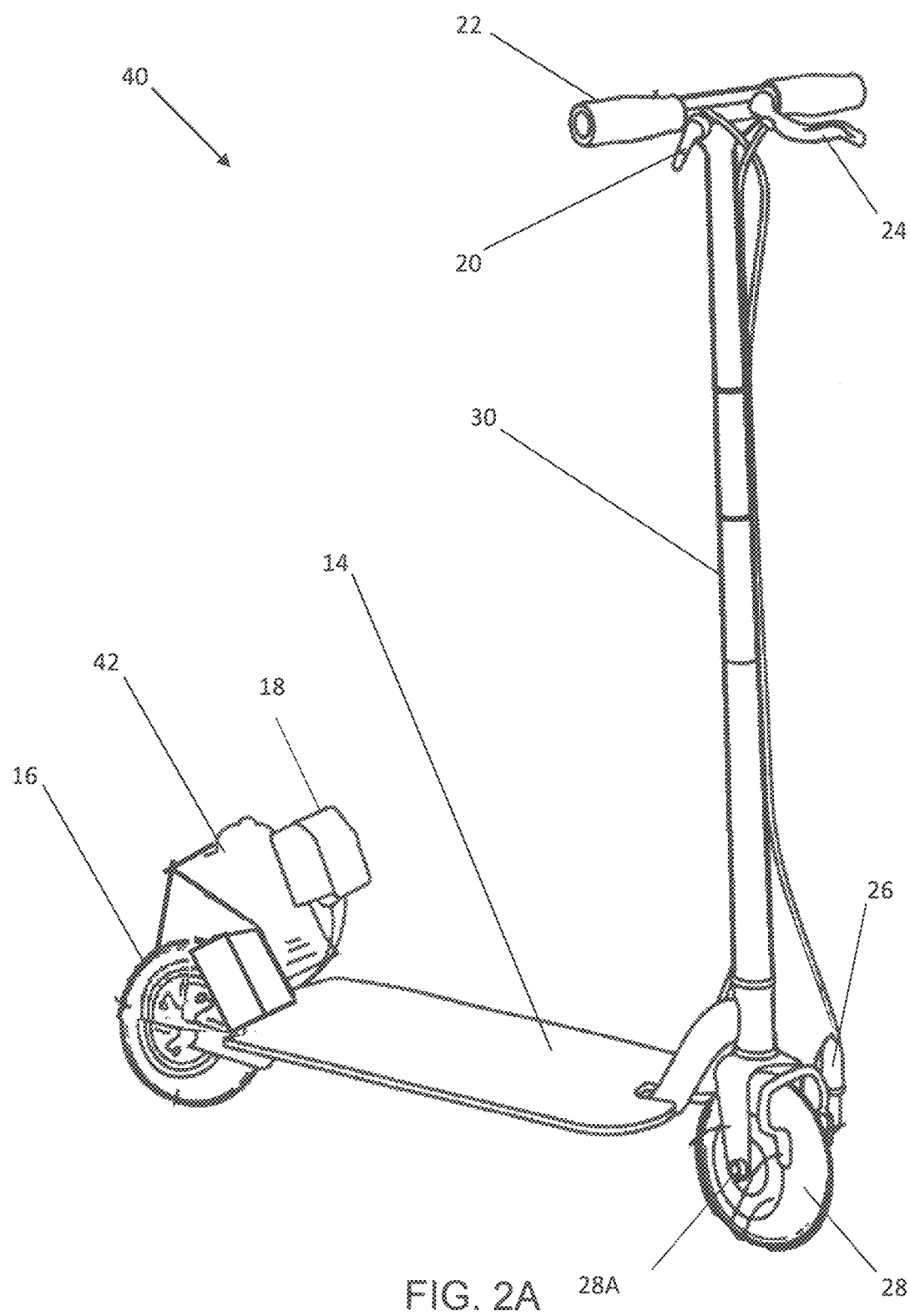
FIG. 2A is a front left side perspective view of an exemplary embodiment of a rear wheel friction drive motor mounted above the platform of the scooter in accordance with embodiments of the invention.
Figure 2B:
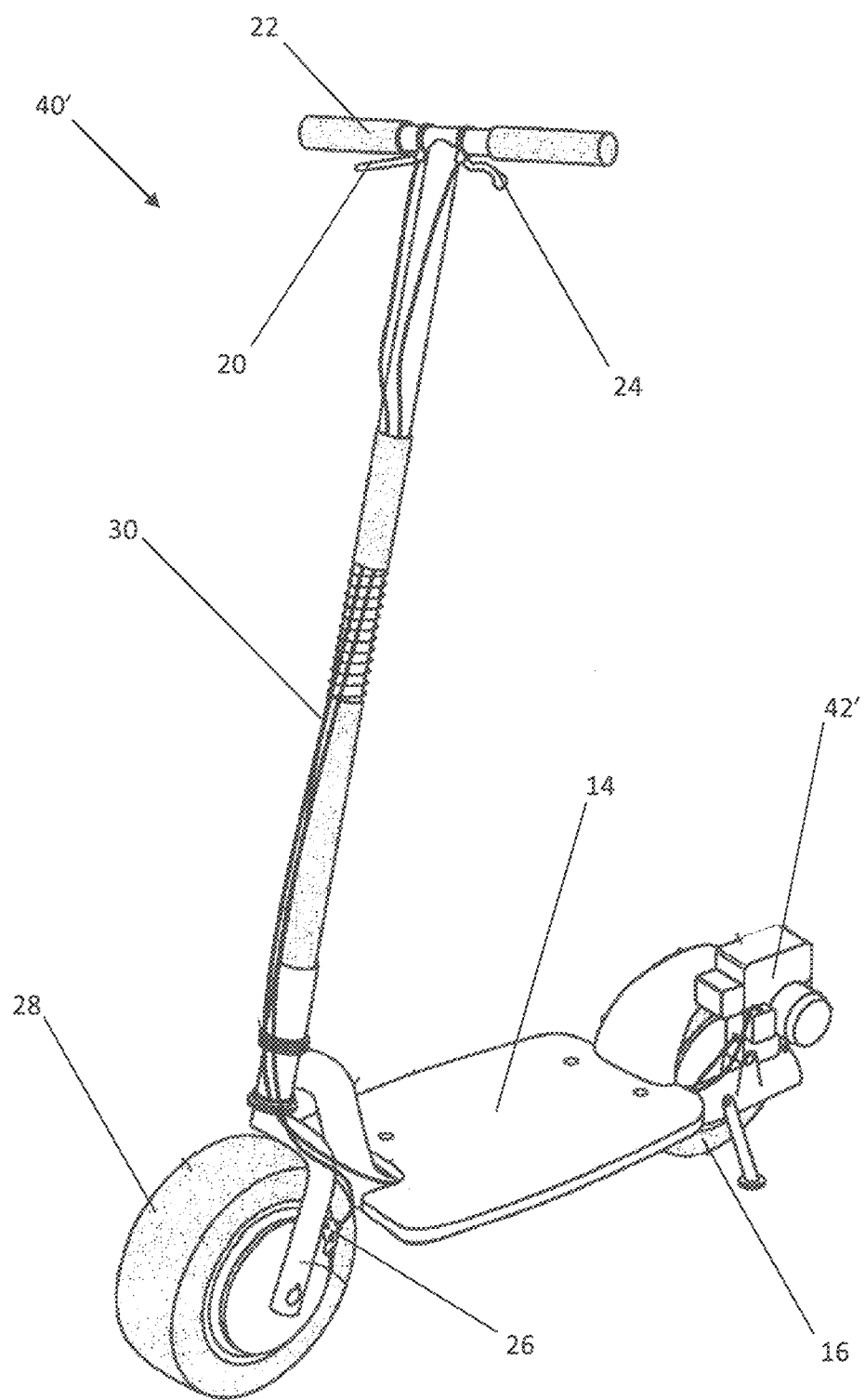
FIG. 2B is a front right side perspective view of an exemplary embodiment of a rear wheel friction drive motor mounted above the platform of the scooter in accordance with embodiments of the invention.

Referring to FIGS. 2A-2B, another embodiment of the scooter 40 may be seen. The scooter 40 may have a rear wheel friction drive motor 42 mounted above the platform 14 by the rear wheel 16 of the scooter 40. The lever-operated clutch 20 engages and disengages the friction drive motor 42 to rear wheel 16.

Figure 3:
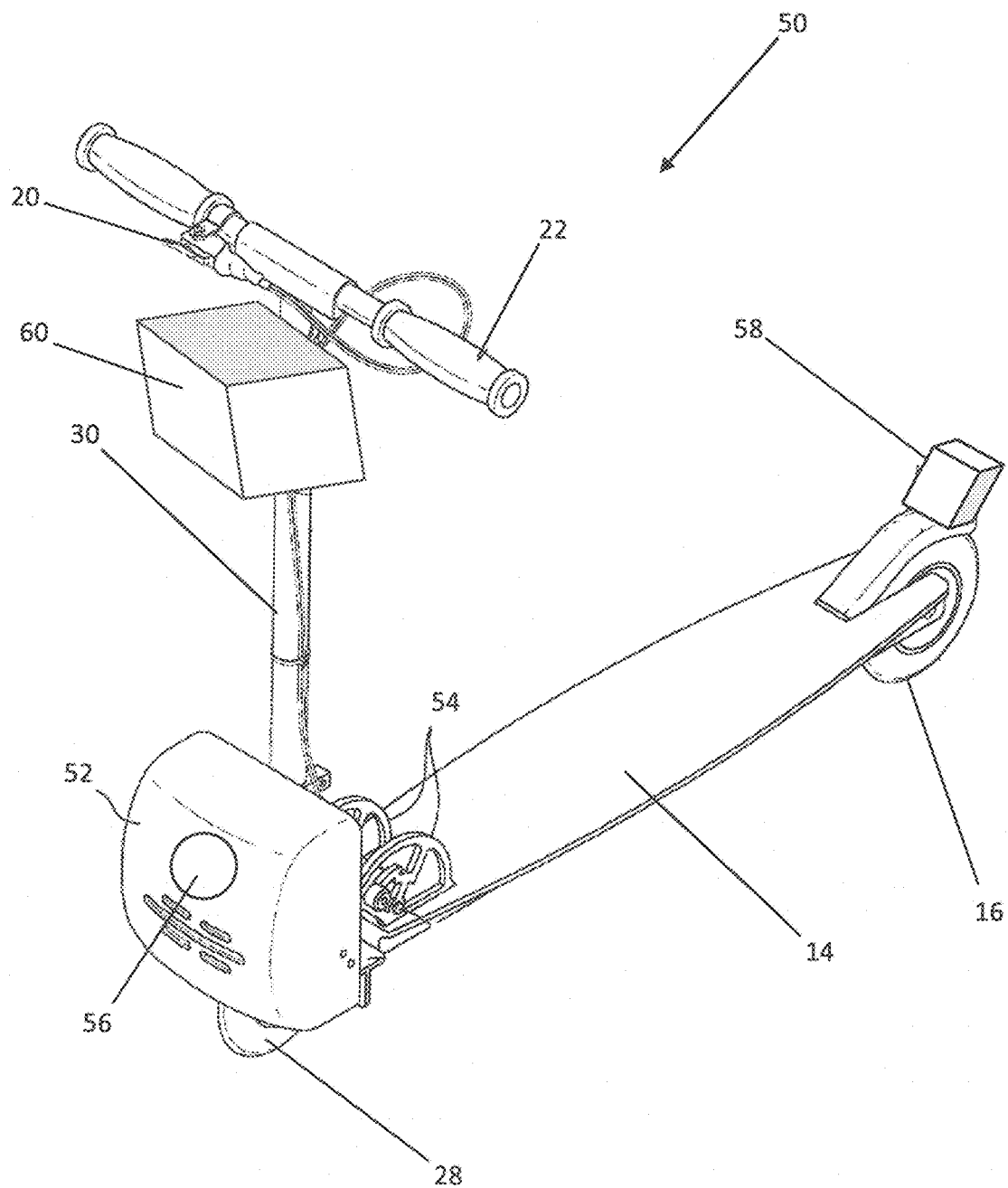
FIG. 3 is a perspective view of an exemplary embodiment of a front wheel friction drive motor mounted above the platform in accordance with embodiments of the invention.

Referring to FIG. 3, a perspective view of an inventive foldable scooter 50 may be seen. The foldable scooter 50 may have a front wheel friction drive motor 52 mounted above the platform 14 and the front wheel 28. The lever-operated clutch 20 engages and disengages the friction drive motor 52 to rear wheel 16. Hinges 54 facilitate the folding of the telescoping shaft 30 against the platform 14. A front facing light 56 and a rear facing light 58 may be mounted to the scooter 50. A collapsible basket 60 may be mounted to the telescoping shaft 30.

Various modifications of the present invention, in addition to those shown and described herein, will be apparent to those skilled in the art of the above description. Such modifications are also intended to fall within the scope of the appended claims.

The foregoing description is illustrative of particular embodiments of the invention, but is not meant to be a limitation upon the practice thereof. The following claims, including all equivalents thereof, are intended to define the scope of the invention.

What is claimed is:

1. A scooter comprising:
   a front wheel at a proximal end of a platform and a rear wheel at opposing distal end of the platform;
   a shaft extending upward from the proximal end of the platform the shaft terminating in a handle bar, wherein that shaft adjusts to set a height of the handle bar with respect to the platform; and
   a friction motor that propels one of the front wheel or the rear wheel of the scooter.

2. The scooter of claim 1 wherein the friction motor comprises a foot pedal that winds the friction motor.

3. The scooter of claim 1 wherein the friction motor is mounted to an underside of the platform.

4. The scooter of claim 1 wherein the friction motor is mounted above one of the front wheel or the rear wheel.

5. The scooter of claim 1 further comprising a lever-operated clutch that engages and disengages the friction drive motor to one of the rear wheel or the front wheel.

6. The scooter of claim 5 wherein the lever-operated clutch is mounted by the handle bar.

7. The scooter of claim 1 further comprising a brake lever that controls a brake mechanism.

8. The scooter of claim 7 wherein the brake lever is mounted by the handle bar.

9. The scooter of claim 1 wherein the front wheel is steerable in conjunction with turning of the handle bar.

10. The scooter of claim 1 further comprising one or more of a front facing light and a rear facing light.

11. The scooter of claim 1 further comprising a collapsible basket.

12. The scooter of claim 11 wherein the collapsible basket is mounted to the shaft.

13. A scooter comprising:
a platform;
a front wheel rotateably coupled to a proximal end of the platform;
a rear wheel rotateably coupled at an opposing distal end of the platform;
a shaft extending upward from the proximal end of the platform, the shaft terminating in a handle bar;
a friction motor that engages and propels the rear wheel of the scooter;
a foot pedal coupled to the friction motor to wind the friction motor; and
a brake lever that controls a brake mechanism.

14. The scooter of claim 13 wherein the friction motor is mounted to an underside of the platform.

15. The scooter of claim 13 wherein the friction motor is mounted above the rear wheel.

16. The scooter of claim 13 comprising a lever-operated clutch that engages and disengages the friction drive motor to the rear wheel.

17. The scooter of claim 13 wherein the front wheel is steerable in conjunction with turning of the handle bar.

18. The scooter of claim 13 further comprising at least one of a front facing light or a rear facing light.

* * * * *